S. Albee,
Fishing-Line Sinker.
N° 83,681.   Patented Nov. 3, 1868.
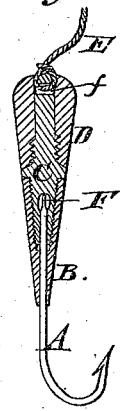
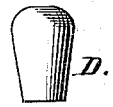
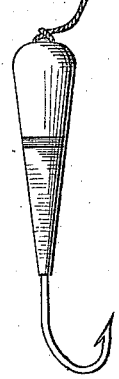
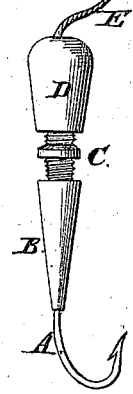
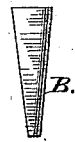
Witnesses:
L. Castle
A. D. Verrill
Inventor:
Sewall Albee

SEWALL ALBEE, OF WISCASSET, MAINE.

Letters Patent No. 83,681, dated November 3, 1868.

FISHING-JIG.

The Schedule referred to in these Letters Patent and making part of the same.

*To all whom it may concern:*

Be it known that I, SEWALL ALBEE, of Wiscasset, in the county of Lincoln, and State of Maine, have invented a new and improved Fishing-Jig; and I do hereby declare that the following is a full and exact description thereof, reference being had to the accompanying drawings, and letters of reference marked thereon, the same to be called "Albee's Patent Fishing-Jig."

The hook A passes, through the tube or cap B, into the aperture F in the centre-piece C. Then the cap B, being screwed on to the centre-piece C, closely compresses the open parts of the lower end of the centre-piece C, and the hook is thus held firmly and securely in its place.

The line E is first passed through the tubular lead D, then through the small aperture $f$, and bent on, after which the lead D is screwed closely on to the upper part of the centre-piece C, and the jig is complete.

Should the hook be broken or spoiled, it is easily replaced by a new one.

This is a great and obvious improvement upon the style of fishing-jig now commonly used by fishermen, which is formed of a body of lead, run on to the hook solid, and, when the hook is once spoiled, that is the destruction of the jig.

By this invention, hooks of different sizes can also be used, and substituted, one for another, in the same jig, and leads of different weights or sizes can be substituted; or the jig can be used without any lead, for the sake of lightness in the water, when desirable, by unscrewing and slipping the lead up the line. The cap and lead are made each with a female screw.

Figure 1 is a sectional view of the jig, with all the parts together.

Figure 2 represents the parts partially separated.

Figure 3 represents the jig ready for use, the full or common size.

Figure 4 represents the parts separately, and placed in their relative positions, the line being omitted.

The tube or cap and the centre-piece may be of copper, or of any metallic or other desirable substance, and lead, pewter, or any other heavy substance, may be used for the lead.

The aperture, for the admission of the hook, in the centre-piece may be of any desirable size, form, or position.

What I claim as my invention, and desire to secure by Letters Patent, is—

The method of forming the body of the jig of three adjustable parts, substantially as described, and especially the method of adjusting, securing, and holding the hook, by means of an adjustable tube or cap, in combination with a centre-piece, containing a screw, fitting the cap, and an aperture, for the admission of the stem of the hook, all substantially as above described.

SEWALL ALBEE.

Witnesses:
L. CASTLE,
B. D. VERRILL.